(12) United States Patent
Lee et al.

(10) Patent No.: US 8,144,571 B2
(45) Date of Patent: Mar. 27, 2012

(54) METHOD OF TRANSMITTING AND PROCESSING DATA AND TRANSMITTER IN A WIRELESS COMMUNICATION SYSTEM

(75) Inventors: Wook Bong Lee, Anyang-si (KR); Bin Chul Ihm, Anyang-si (KR); Moon Il Lee, Anyang-si (KR); Hyun Soo Ko, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 12/449,155

(22) PCT Filed: Feb. 5, 2008

(86) PCT No.: PCT/KR2008/000742
§ 371 (c)(1),
(2), (4) Date: Jul. 24, 2009

(87) PCT Pub. No.: WO2008/097038
PCT Pub. Date: Aug. 14, 2008

(65) Prior Publication Data
US 2010/0149961 A1    Jun. 17, 2010

Related U.S. Application Data

(60) Provisional application No. 60/888,793, filed on Feb. 8, 2007, provisional application No. 61/016,806, filed on Dec. 26, 2007.

(30) Foreign Application Priority Data

Apr. 2, 2007  (KR) .................. 10-2007-0032251

(51) Int. Cl.
*H04J 9/00*  (2006.01)

(52) U.S. Cl. ........ 370/204; 370/330; 370/208; 370/478; 375/260

(58) Field of Classification Search .................. 370/204, 370/208, 330, 478; 375/260, 298
See application file for complete search history.

(56) References Cited

U.S. PATENT DOCUMENTS 6,516,039 B1 * 2/2003 Taura et al. .................. 375/354
(Continued)

FOREIGN PATENT DOCUMENTS

EP          1 538 802      6/2005
WO     WO 2006/060780     6/2006

OTHER PUBLICATIONS

Nortel, CMCC, "LTE-B parameters for the Dedicated Broadcast Carrier", 3GPP TSG RAN WG1 Meeting #47, R1-063107, Nov. 2006.

(Continued)

*Primary Examiner* — Ricky Ngo
*Assistant Examiner* — Rasheed Gidado
(74) *Attorney, Agent, or Firm* — McKenna Long & Aldridge LLP (57) ABSTRACT

A method for transmitting/processing data in a wireless communication system, and a transmitter are disclosed. A method processing method for data transmission at a transmitting side of a wireless communication system employing multiple carriers comprises performing a symbol mapping process on a binary data sequence, and generating a symbol sequence, converting the symbol sequence into a time-domain symbol using a plurality of sub-carriers having a variable sub-carrier spacing therebetween, and adding a cyclic prefix to the time-domain symbol.

4 Claims, 10 Drawing Sheets

U.S. PATENT DOCUMENTS

| | | | |
|---|---|---|---|
| 6,567,383 B1* | 5/2003 | Bohnke | 370/280 |
| 6,816,452 B1* | 11/2004 | Maehata | 370/208 |
| 2005/0180313 A1* | 8/2005 | Kim et al. | 370/208 |
| 2006/0068698 A1* | 3/2006 | Sandhu et al. | 455/1 |
| 2006/0109865 A1* | 5/2006 | Park et al. | 370/482 |
| 2006/0115012 A1* | 6/2006 | Sadowsky et al. | 375/260 |
| 2007/0058595 A1* | 3/2007 | Classon et al. | 370/337 |
| 2007/0066362 A1* | 3/2007 | Ma et al. | 455/562.1 |
| 2007/0159959 A1* | 7/2007 | Song et al. | 370/208 |

OTHER PUBLICATIONS

Huawei, "Further Consideration on Multiplexing of Unicast and MBMS", 3GPP TSG-RAN WG1 Meeting Ad Hoc LTE, R1-060235, Jan. 2006.

NTT DoCoMo et al., "OFDM Radio Parameter Set in Evolved UTRA Downlink", 3GPP TSG RAN WG1 Ad Hoc on LTE, R1-050587, Jun. 2005.

* cited by examiner

METHOD OF TRANSMITTING AND PROCESSING DATA AND TRANSMITTER IN A WIRELESS COMMUNICATION SYSTEM

This application claims priority to International Application No. PCT/KR2008/000742 filed on Feb. 5, 2008, which claims priority to Korean Patent Application No. 10-2007-0032251, filed on Apr. 2, 2007, U.S. Provisional Application No. 60/888,793, filed Feb. 8, 2007 and U.S. Provisional Application No. 61/016,806, filed Dec. 26, 2007, all of which are incorporated by reference for all purposes as if fully set forth herein.

TECHNICAL FIELD

The present invention relates to a wireless communication system, and more particularly to a method for transmitting/processing data in a wireless communication system, and a transmitter.

BACKGROUND ART

Time dispersive characteristics (also called "delay spread characteristics") between sub-carriers in a mobile communication system employing a plurality of sub-carriers have been determined according to communication environments of a cell managed by a base station (i.e., Node-B). For example, a large amount of time delay occurs in an urban district whereas a small amount of time delay occurs in a vast expanse of land. However, frequency dispersive characteristics (also called "Doppler spread") between sub-carriers depend on a channel variation affected by a speed between a transmitter and a receiver.

A representative example of the mobile communication system employing a plurality of sub-carriers is an Orthogonal Frequency Division Multiplexing (OFDM) system. The OFDM system inserts various-sized guard intervals to reflect various time dispersive characteristics affected by communication situations. There are two kinds of guard intervals, a cyclic prefix (CP) and a cyclic postfix (CP). Theoretically, if all multi-taps are arrived in the cyclic prefix, there is no inter-symbol interference (ISI). For example, the CP length of the Orthogonal Frequency Division Multiplexing Access (OFDMA) system prescribed in the IEEE 802.16 system is selected from 2.85 μs~22.8 μs at a bandwidth of 10 MHz.

A conventional OFDM system has no additional solution for reflecting various frequency dispersive characteristics affected by communication situations, because a cell includes a plurality of mobile terminals (or user equipments) of different speeds, so that the conventional OFDM system is unable to set a focal point on only a specific mobile terminal from among them. As a result, a spacing between sub-carriers (hereinafter referred to as a sub-carrier spacing) must be uniformly established on the basis of the highest speed capable of being supported by a corresponding communication system.

However, if the sub-carrier spacing is fixed at a specific value and a mobile-terminal speed is higher than a reference speed, inter-carrier interference increases by the above-mentioned frequency dispersive characteristics, and orthogonal characteristics of a signal is broken, so that the reliability of data transmission may be deteriorated. Otherwise, if the mobile-terminal speed is lower than a reference speed, unnecessary resources are allocated so that the utility of frequency resources may be deteriorated.

DISCLOSURE OF THE INVENTION

Accordingly, the present invention is directed to a method for transmitting/processing data in a wireless communication system, and a transmitter that substantially obviate one or more problems due to limitations and disadvantages of the related art.

An object of the present invention is to provide a method for variably configuring a sub-carrier spacing in a wireless communication system based on multiple carriers (i.e., multi-carrier) according to a variety of requirements, so that it increases communication efficiency, and saves radio resources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data over a network of a wireless communication system employing multiple carriers, the method comprising transmitting first data, which has been converted into a time-domain signal by sub-carriers having a first sub-carrier spacing therebetween, to at least one user equipment (UE), and transmitting second data, which has been converted into a time-domain signal by sub-carriers having a second sub-carrier spacing therebetween, to at least one user equipment (UE).

In another aspect of the present invention, there is provided a data processing method for data transmission at a transmitting side of a wireless communication system employing multiple carriers, the method comprising performing a symbol mapping process on a binary data sequence to generate a symbol sequence, converting the symbol sequence into a time-domain symbol using a plurality of sub-carriers having a variable sub-carrier spacing therebetween, and adding a cyclic prefix to the time-domain symbol.

In yet another aspect of the present invention, there is provided a transmission apparatus for use in a wireless communication system employing multiple carriers, the apparatus comprising a symbol mapping module for performing a symbol mapping process on a binary data sequence to generate a symbol sequence, a frequency-time conversion module for converting the symbol sequence into a time-domain symbol using a plurality of sub-carriers having a variable sub-carrier spacing therebetween, and a cyclic prefix (CP) addition module for adding a cyclic prefix to the time-domain symbol.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MOD FOR CARRYING OUT THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

Figure 1:
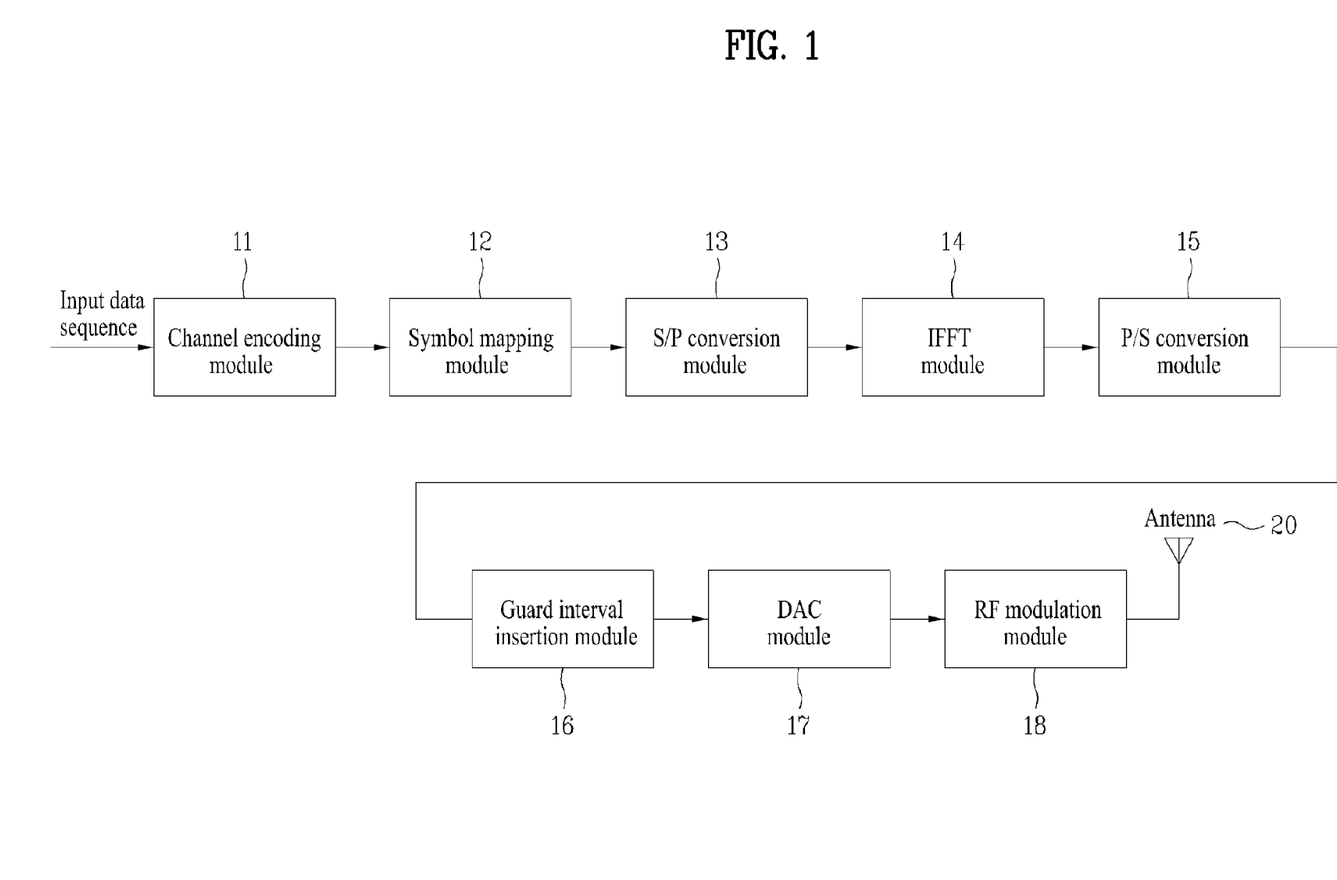
FIG. 1 is a block diagram illustrating a transmitter according to an embodiment of the present invention.

FIG. 1 is a block diagram illustrating a transmitter according to an embodiment of the present invention. Characteristics of the transmitter of FIG. 1 are applied to a transmitting side of an OFDMA system acting as an example of a wireless communication system based on multiple carriers.

The OFDM scheme divides a high-speed data sequence into a plurality of low-speed data sequences, simultaneously transmits the low-speed data sequences to a destination using a plurality of sub-carriers having orthogonality, so that it increases a symbol duration. As a result, a time-domain relative dispersion (i.e., time dispersive characteristic) caused by a multi-path delay spread is lowered.

In the meantime, in order to overcome the limitation of an amount of code resources in a Code Division Multiple Access (CDMA) scheme, an Orthogonal Frequency Division Multiple Access (OFDMA) scheme has been introduced to the market. The OFDMA scheme is a representative example of a Multi-Carrier Modulation (MCM) scheme. The MCM scheme discriminates between users using a sub-channel capable of maintaining a plurality of orthogonalities, so that it transmits data for each user. The OFDM scheme transmits data using a multi-carrier, converts a serial symbol sequence into a parallel symbol sequence, modulates the parallel symbol sequence into sub-carriers having orthogonality, and transmits the sub-carriers.

A physical layer of the OFDMA scheme may divide active carriers into at least two carrier groups, and individual groups can be transmitted to different receiving side, respectively. In this case, a carrier group transmitted to either one of reception ends is called a sub-channel. Sub-carriers contained in each sub-channel may neighbor with each other, and may be spaced apart from each other at intervals of the same distance.

However, as the mobile terminal moves from a current location to another location at a given speed or higher, Inter-Carrier Interference (ICI) may occur, so that a subcarrier spacing may be generally arranged between sub-carriers. For example, the 3rd Generation Partnership Project (3GPP) Long Term Evolution (LTE) has defined the sub-carrier spacing as 15 kHz, a WiMAX system of the IEEE 802.16e has defined the sub-carrier spacing as 10.94 KHz. For reference, the 3GPP LTE has assumed that a target speed of a mobile terminal (i.e., user equipment UE) is about 350 km/h, and the IEEE 802.16e has assumed that a UE's tolerable speed is 60 km/h~120 km/h.

Referring to FIG. 1, the transmitter 10 comprises a channel encoding module 11, a symbol mapping module 12, a SIP conversion module 13, an Inverse Fast Fourier Transform (IFFT) module 14, a P/S conversion module 15, a guard interval insertion module 16, a DAC module 17, a RF modulation module 18, and an antenna 20.

The channel encoding module 11 performs channel encoding on an input data sequence. The symbol mapping module 12 performs digital modulation on the data sequence channel-encoded by the channel encoding module 11 to map at least two bits of the channel-encoded data sequence to a symbol. The S/P conversion module 13 converts a symbol sequence generated from the symbol mapping module 12 into a parallel symbol sequence. The IFFT module 14 variably applies a sub-carrier spacing to the parallel symbol sequence generated from the S/P conversion module 13, and converts the applied result into a time-domain symbol by an IFFT scheme. The P/S conversion module 15 converts a parallel signal generated from the IFFT module 14 into a serial signal. The guard interval insertion module 16 inserts a guard interval into the time-domain symbol generated from the IFFT module 14. The DAC module 17 converts an output symbol of the guard interval insertion module 16 into an analog signal. The RF modulation module 18 modulates an output signal of the DAC module 17 into other signals using a high frequency. The antenna 20 transmits an output signal of the RF modulation module 18.

The channel encoding process performed by the channel encoding module 11 indicates that a specific signal agreed between a transmitting side and a receiving side is added by the transmission end to a transmission (Tx) signal on a transmitting channel, so that errors caused by noise or interference on the transmitting channel are detected and damaged signals are recovered. The channel decoding process is an inverse process of the above-mentioned channel encoding process, and indicates that the reception end recovers original data from the channel-encoded data received from the transmission end. A variety of channel encoding or channel decoding processes have been widely used for communication systems, for example, a convolution-coding, a turbo-coding, and a Low Density Parity Check (LDPC) coding.

The symbol mapping module 12 performs digital modulation on the output data sequence of the channel encoding module 11, and maps the channel-encoded data sequence to symbols. The above-mentioned digital modulation is adapted to map two or more bits to a single symbol, and there are a variety of modulation schemes, for example, a Binary Phase Shift Keying (BPSK), a Quadrature Phase Shift Keying (QPSK), a 16-Quadrature Amplitude Modulation (QAM), a 64-QAM, and a 256-QAM. However, it should be noted that the scope of the present invention is not limited to only the above-mentioned modulation schemes, and can also be applied to other examples as necessary. The S/P conversion module 13 converts the symbol sequence generated from the symbol mapping module 12 into a parallel symbol sequence.

The IFFT module 14 variably applies the sub-carrier spacing to the parallel symbol sequence generated from the S/P conversion module 13, performs the IFFT on the applied result, so that the IFFT result is converted into a time-domain symbol. In other words, the IFFT module 14 maps each symbol to a corresponding sub-carrier of the parallel symbol sequence, and modulates the mapping result, so that each symbol is loaded on each sub-carrier. In this case, a total bandwidth for use in a specific cell is fixed at 10 MHz or 20 MHz, so that the number of all sub-carriers contained in the total bandwidth is also determined according to the fixed bandwidth value. As described above, the IFFT module 14 variably applies the sub-carrier spacing to the parallel symbol sequence, and performs the IFFT on the applied result. For example, provided that the number of all sub-carriers contained in the total bandwidth of 20 MHz is 2048, a first sub-carrier spacing made when 1024 sub-carriers from among 2048 sub-carriers are used is double a second sub-carrier spacing made when all the 2048 sub-carriers are used. In other words, the sub-carrier spacing can be variably applied to the parallel symbol sequence by adjusting the number of sub-carriers for use in the IFFT process from among all the sub-carriers. In view of technical progress, the IFFT module 14 can control the sub-carrier spacing by controlling the IFFT size. Namely, if 2048 sub-carriers are used, the IFFT size is set to 2048. If 1024 sub-carriers are used, the IFFT size is set to 1024. The IFFT size of 1024's sub-carrier spacing is doubled compared to that of IFFT size of 2048.

The transmitter 10 may variably establish the sub-carrier spacing required for the IFFT process executed by the IFFT module 14 according to the cell-coverage size or the input-data type, etc. For example, the sub-carrier spacings may be differently assigned to a first case in which the input data acts as data for use in a unicast service and a second case in which the input data acts as data for use in a broadcast service. For another example, the sub-carrier spacing applied to data of a rapidly-moving UE may be longer than the other sub-carrier spacing applied to data of a slowly-moving UE. Information associated with the sub-carrier spacing or the IFFT size applied to the IFFT process of the IFFT module 14 may be received from an upper layer or an upper-network node.

The P/S conversion module 15 converts an output symbol of the IFFT module 14 into a serial symbol. The guard interval insertion module 16 inserts a cyclic prefix or cyclic postfix into the output symbol of the P/S conversion module 15, so that it generates a guard interval. Preferably, the length of the cyclic prefix or the length of the cyclic postfix may be variably established according to the sub-carrier spacing.

The symbol sequence equipped with the guard interval is converted into an analog signal by the DAC module 17. The analog signal is modulated by a high frequency signal of the RF modulation module 18, and the power of the modulated signal is amplified by a power amplifier (not shown), so that the power-amplified signal is transmitted to the reception end via the antenna 19. The above-mentioned constituent components contained in the transmitter of FIG. 1 have been disclosed for only illustrative purposes of the present invention, and other additional constituent components (e.g., an interleaver) may be further included in the transmitter as necessary.

Figure 2A:
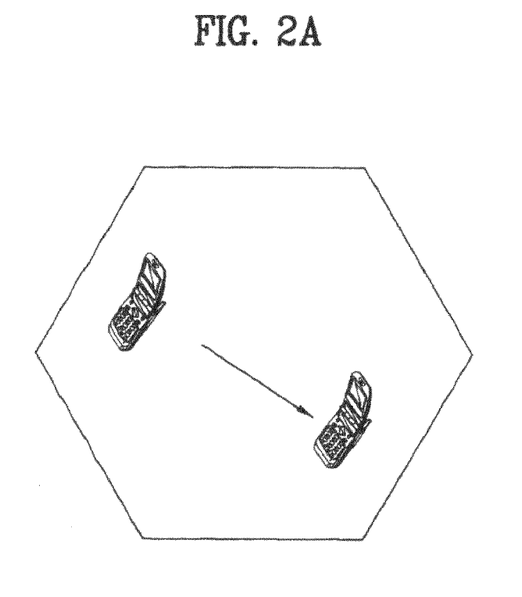
FIGS. 2A~2B are conceptual diagrams illustrating application examples according to the present invention.
Figure 2B:
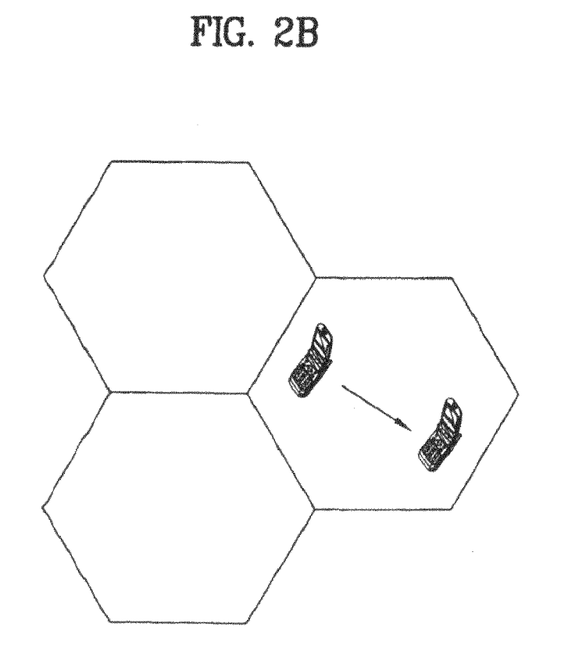

FIGS. 2A~2B are conceptual diagrams illustrating application examples according to the present invention.

Referring to FIG. 2A, as the UE's moving speed increases, the Inter-Carrier Interference (ICI) increases by frequency dispersive characteristics, so that the orthogonality of a Tx signal may be easily broken. For example, if the user equipment (UE) with a high mobility is located at a wide coverage (e.g., a suburb) of a Node-B, the above-mentioned problem may occur. In other words, there is every probability that the UE with the high mobility exists in a large-sized cell shown in FIG. 2A, so that the probability of generating the inter-carrier interference (ICI) is very high. In this case, in order to remove the ICI, the sub-carrier spacing must be increased in units of a predetermined-sized frequency corresponding to the cell size.

Referring to FIG. 2B, if the user equipment (UE) is located at an urban district in which several Node-Bs are crowded, i.e., if the Node-B coverage is relatively small, there is a limitation in the UE's mobility within the cell. Therefore, although the sub-carrier spacing of FIG. 2B is further reduced in a small-sized cell of less than a predetermined size as compared to FIG. 2A, the probability of generating the ICI is reduced. In other words, as can be seen from FIG. 2B, the sub-carrier spacing is reduced in the small-sized cell, so that transmission efficiency is improved.

Figure 3A:
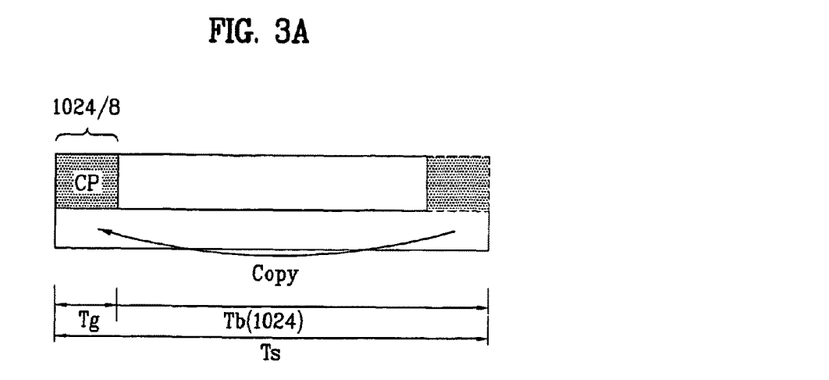
FIGS. 3A~3C show time-domain symbols affected by various results acquired when an OFDMA system performs an IFFT process on different sub-carrier spacings and generates a cyclic prefix (CP) area according to an embodiment of the present invention.
Figure 3B:
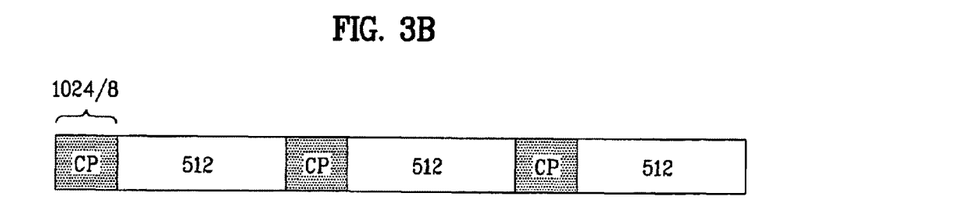
Figure 3C:
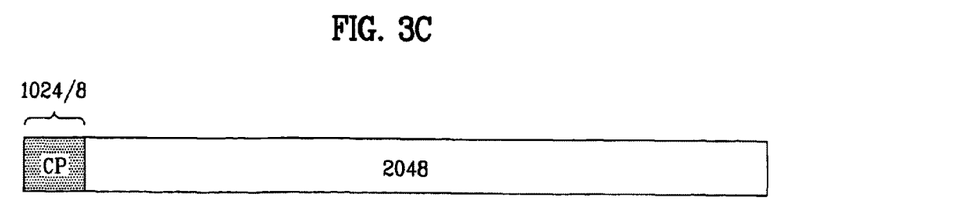

FIGS. 3A~3C show time-domain symbols affected by various results acquired when an OFDMA system performs an IFFT process on different sub-carrier spacings and generates a cyclic prefix (CP) area according to the present invention.

Referring to FIG. 3A, a symbol duration of the time-domain OFDM symbol acquired by the IFFT is called an effective symbol duration ($T_b$). A part ($T_g$) of an end of the effective symbol duration is copied at the head of the OFDM symbol, the cyclic prefix is generated, so that the orthogonality between symbols may be maintained or the fading caused by a multi-path may be removed. In other words, the OFDMA system transmits data in units of a symbol, i.e., the OFDMA system transmits data on the basis of a symbol. While this OFDM symbol is transmitted over a multi-path channel, it is affected by a previous symbol. In order to prevent the ICI from being generated in the OFDM system, a guard interval longer than a maximum delay spread is inserted between successive symbols. Therefore, the OFDM symbol duration ($T_s$) is equal to the sum of the effective symbol duration ($T_b$) and the guard interval ($T_g$). The reception end removes the guard interval, acquires data generated during the effective symbol duration ($T_b$), and demodulates the data.

For example, if "S" is a sampling duration, a basic effective symbol duration of the OFDM symbol may be set to "1024*S", and the cyclic prefix (CP) size may be set to "1024/8*S".

If the UE is rapidly moving at a reference speed or higher, the sub-carrier spacing may be increased so that the effective symbol duration of the OFDM symbol reaches "512*S" to reduce the ICI as shown in FIG. 3B. In this case, provided that there is no change in the CP size, the effective symbol direction of FIG. 3B is set to "1280 (=(512+1024/8)*2))*S" to transmit data of "1024 (=512*2)*S". Compared with FIG. 3B, the effective symbol duration of FIG. 3A is set to "1152 (=1024+1024/8)*S" to transmit the same amount of data (i.e., data of "1024 (=512*2)*S" as in FIG. 3B, so that the transmission efficiency is deteriorated in proportion to the sub-carrier spacing. However, the sub-carrier spacing is doubled so that the ICI is prevented, resulting in the reliability of data transmission.

In the meantime, if the user equipment (UE) is slowly moving at a reference speed or less, the sub-carrier spacing may be reduced so that the effective symbol duration of a unit symbol reaches "2048*S" as shown in FIG. 3C. In this case, provided that there is no change in the CP size, the effective symbol direction of FIG. 3A is set to "2304 (=(1024+1024/8)*2))*S" to transmit data of "2048 (=1024*2)*S". Compared with FIG. 3A, the effective symbol duration of FIG. 3C is set to "2176 (=2048+1024/8)*S" to transmit the same amount of data (i.e., data of "2048 (=1024*2)*S") as in FIG. 3A, so that the transmission efficiency increases in inverse proportion to the sub-carrier spacing. In this case, it is assumed that no ICI occurs by the reduced sub-carrier spacing.

According to one embodiment of the present invention, the sub-carrier spacing applied to the IFFT process is variably established. Therefore, when the transmission end transmits Tx data to the reception end, the transmission end must inform the reception end of specific information indicating the sub-carrier spacing applied to the Tx data.

For example, if a Node-B transmits Tx data to the user equipment (UE) over a specific traffic channel, it may inform the UE of information indicating the sub-carrier spacing applied to corresponding data over a control channel corresponding to the traffic channel. The UE receives the indication information over the control channel, and demodulates the received data using a corresponding sub-carrier spacing.

If the sub-carrier spacing is differently established according to the size of cell coverage, the user equipment (UE) applies a predetermined basic sub-carrier spacing to a variety of control information required for data transmission/reception executed when the UE is newly powered on or enters a new cell and performs a cell registration in the new cell, so that data is transmitted or received according to the basic sub-carrier spacing. The basic sub-carrier spacing is set to the same value in a corresponding communication system. For example, the IEEE 802.16e-based WiMAX system sets the basic sub-carrier spacing to 10.94 kHz. The UE acquired indication information indicating the sub-carrier spacing from the received control information, applies a corresponding sub-carrier spacing within a corresponding cell, and transmits/receives data. If the UE moves from a first cell to a second cell and is handed over from the first cell to the second cell, it receives control information from a target cell, acquires the sub-carrier spacing for use in the target cell, and receives data from the target cell.

There are a variety of control channels for transmitting the indication information indicating the sub-carrier spacing. For example, the WLAN standard (e.g., IEEE 802.11a, 802.11b, and 802.11g) may use a Forward Control Channel (FCCH), and the UMTS may use a Broadcast Control Channel (BCCH), a Paging Control Channel (PCCH), a Common Control Channel (CCCH), a Dedicated Control Channel (DCCH), and a Shared Channel Control Channel (SHCCH).

If the sub-carrier spacing is differently established according to the cell-coverage size, a method for informing the UE of indication information indicating the sub-carrier spacing for use in a specific cell using repetitive characteristics of a preamble according to an embodiment of the present invention will hereinafter be described in detail.

The preamble is a first-transmission OFDMA symbol contained in a downlink frame, so that the OFDMA symbol from among several symbols contained in the downlink frame is firstly transmitted. For example, the preamble is used for initial frame synchronization caused by the power-ON or cell-entry operation, searches for a cell for handover, or performs channel estimation.

In order to search for the initial frame synchronization, the IEEE 802.16d transmits a preamble code to only a sub-carrier equipped with an index divided by "3" in a first sector, transmits the preamble code to only a sub-carrier equipped with an index, which has a remainder of 2 when it is divided by "3", in a second sector, and transmits the preamble code to only a sub-carrier equipped with an index, which has a remainder of 1 when it is divided by "3", in a third sector, so that the first to third sectors contained in a single cell can be discriminated from each other.

If the preamble is constructed as described above, individual sectors transmit the preamble code via different sub-carriers, so that there is no inter-sector interference. From the viewpoint of a time domain, the same code is repeated three times, so that a repetitive pattern is formed in the time domain. Therefore, the UE searches for the initial frame synchronization using the time-domain repetitive pattern, before it searches for a cell.

In the meantime, the IEEE 802.16e uses OFDM symbols of different FFT sizes according to a frequency bandwidth of a system. For example, "128" may be used at a bandwidth of 12.5 MHz, "512" may be used at a bandwidth of 5 MHz, and "1024" may be used at a bandwidth of 10 MHz.

Therefore, this embodiment of the present invention provides a method for using the OFDM symbols of different FFT sizes according to the sub-carrier spacing for use in each sector (or each cell). For example, "1024" may be used at a bandwidth of 10.94 MHz, "512" may be used at a bandwidth of 21.88 kHz, and "2048" may be used at a bandwidth of 5.47 kHz. The UE contained in a specific sector (or a specific cell) detects the three repetitive patterns, recognizes the FFT size on the basis of the detected repetitive patterns, and estimates a sub-carrier spacing of a corresponding sector (or a corresponding cell).

According to the above-mentioned embodiments of the present invention, the Node-B reflects different mobilities of individual UEs contained in its coverage, so that it can inform the individual UEs of different sub-carrier spacings.

Figure 4A:
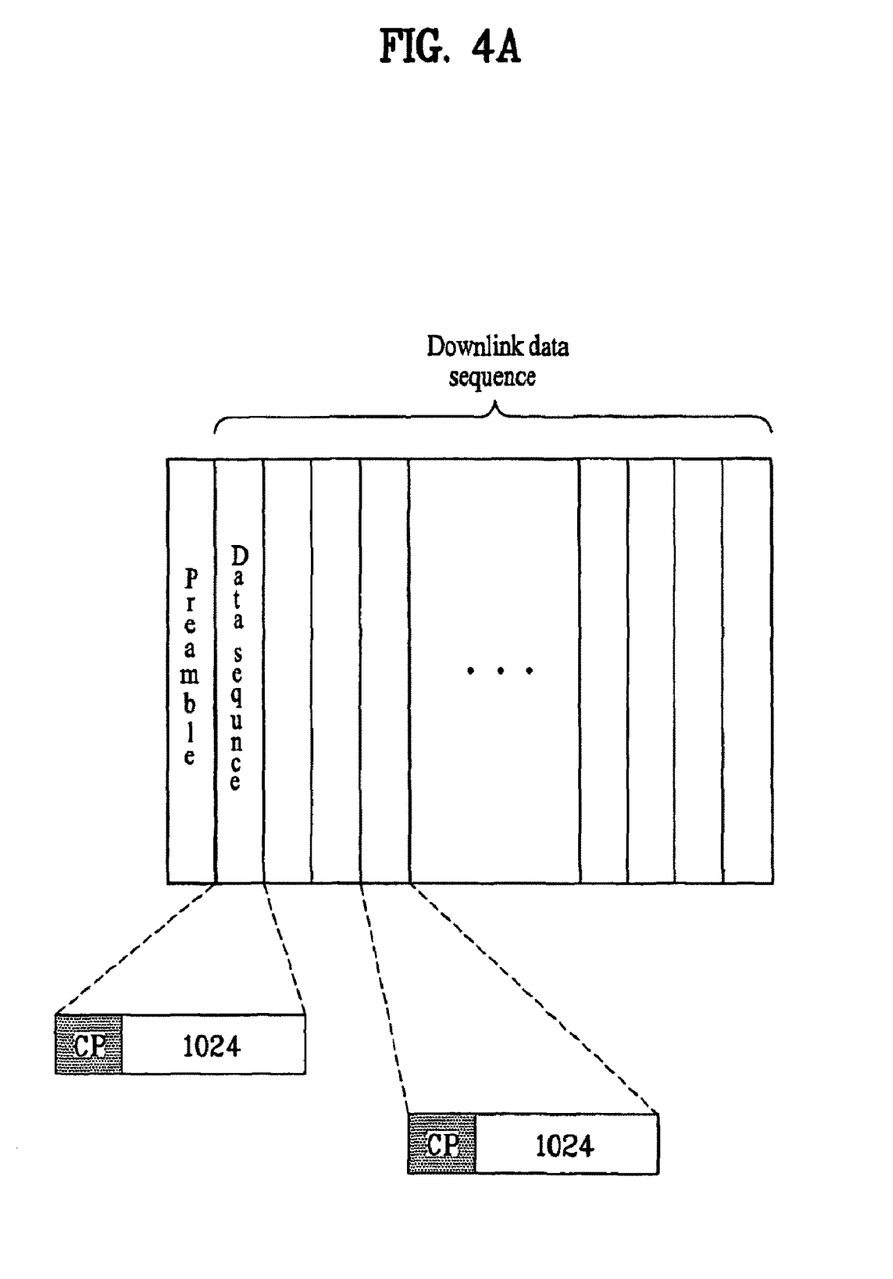
FIG. 4A is a downlink frame structure for use in an OFDM system according to an embodiment of the present invention.

FIG. 4A is a downlink frame structure for use in an OFDM system according to the present invention.

Referring to FIG. 4A, a downlink frame includes an OFDM symbol for a preamble and OFDM symbols for data transmission. In this case, the present invention is characterized in that the OFDM symbols for the data transmission have the same sub-carrier spacing of 1024 FFT size therebetween. Therefore, in order to satisfy a maximum transfer rate within a given limitation where no ICI occurs between UEs contained in a specific cell, the present invention establishes the sub-carrier spacing on the basis of the highest-mobility UE from among the UEs, and equally applies the established sub-carrier spacing to the remaining UEs other than the highest-mobility UE.

Figure 4B:
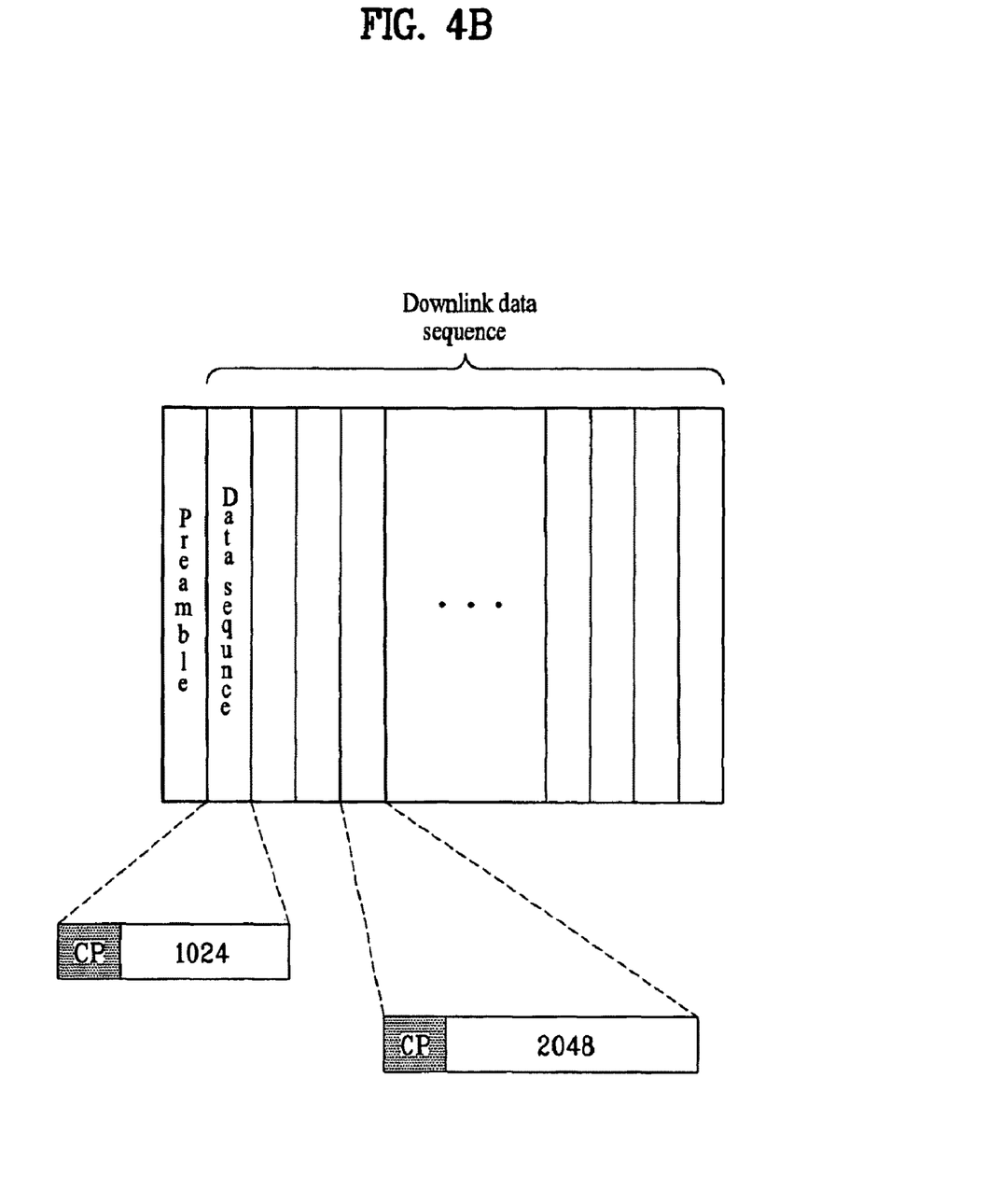
FIG. 4B is a downlink frame structure in which variable sub-carrier spacings are applied to individual OFDM symbols according to an embodiment of the present invention.

FIG. 4B is a downlink frame structure in which variable sub-carrier spacings are applied to individual OFDM symbols according to the present invention. Referring to FIG. 4B, the Node-B applies a variable sub-carrier spacing to input data, and performs the IFFT on the applied result, so that it may generate OFDM symbols of different effective symbol durations. For example, if the effective symbol duration of the preamble symbol may be different from that of the data symbol, or the OFDM symbols contained in a single downlink frame may have different effective symbol durations. For another example, a variable sub-carrier spacing is applied to the downlink frame, so that individual downlink frames may have different effective symbol durations.

Figure 5:
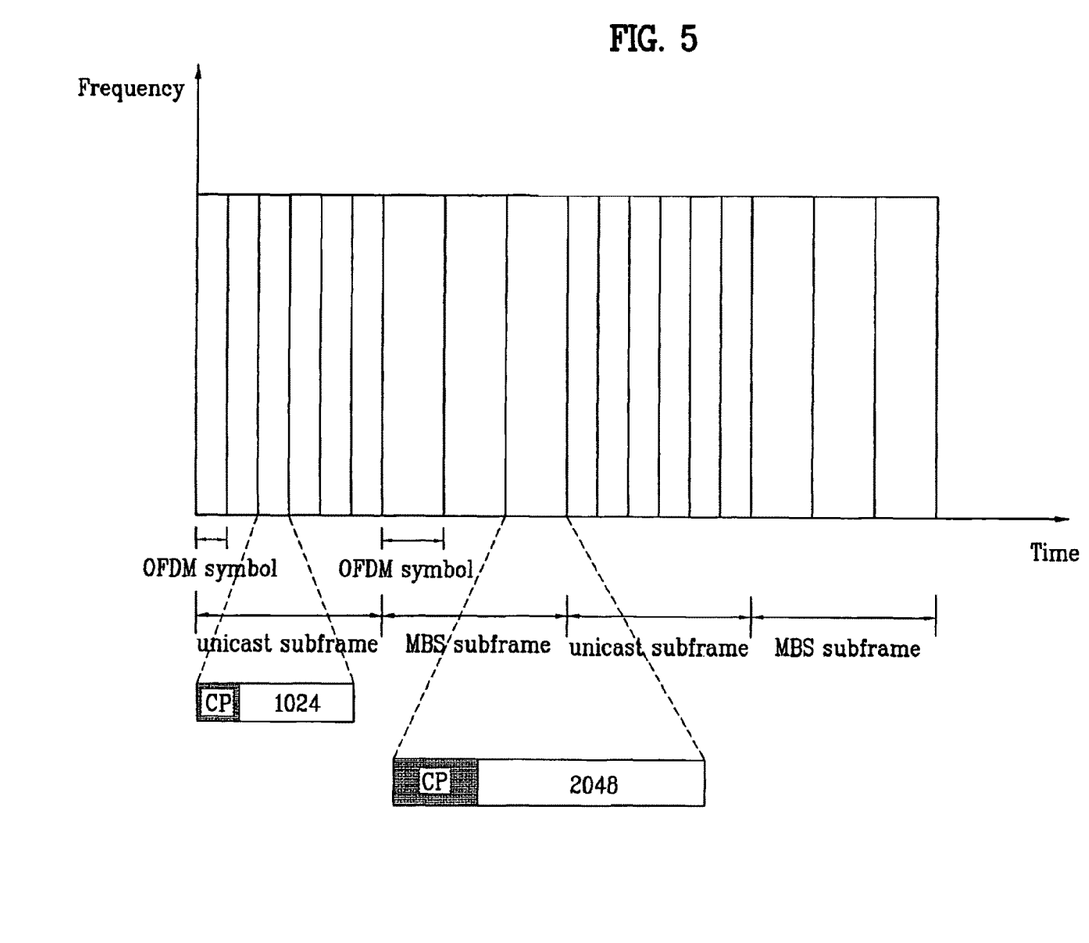
FIG. 5 is a downlink data frame structure according to an embodiment of the present invention.

FIG. 5 is a downlink data frame structure according to an embodiment of the present invention. In more detail, if the sub-carrier spacing (i.e., IFFT size) or the cyclic prefix (CP) size is differently established according to a type of service transmitted from the Node-B to the downlink, the downlink data frame of FIG. 5 is formed. The embodiment of FIG. 5 transmits a unicast service or a Multicast and Broadcast service (MBS) to the UE according to the Time Division Multiplexing (TDM) scheme.

Generally, the MBS is transmitted according to a Single Frequency Network (SFN) scheme, so that the UE receives the same data from multiple cells and combines the received data, resulting in the implementation of a diversity effect. In this case, the UE recognizes data received from other cells as its own data having no interference, differently from the general unicast service, so that the UE based on the MBS service can acquire a single frequency network (SFN) gain having the same effect as in a frequency-diversity or macro-diversity. In this case, a delay spread of the same channel response in the MBS service is larger than that of the unicast service. Therefore, it is preferable that the CP length of the MBS service be larger than that of the unicast service.

However, the longer the CP length, the smaller the amount of Tx data during the same time. Therefore, the CP length of the MBS service must be effectively determined. Generally, the delay spread of signals received from other cells is very high in a large-sized cell coverage, so that the CP length is set to a long length. The delay spread of signals received from other cells is relatively low in a small-sized cell coverage, the CP length is set to a short length. In this way, the efficiency can be maximized.

According to the embodiment of FIG. 5, in order to simultaneously support the unicast service and the MBS service in the large-sized cell coverage, the sub-carrier spacing and the CP length applied to data of the unicast service are different from those of data of the MBS service. As described above, if the signals received from other cells have a high delay spread due to the large-sized cell coverage, it is preferable that the CP length be set to a long length. In the meantime, in order to simultaneously support the unicast service and the MBS service using a single frame structure, it is assumed that the unicast subframe length is equal to the MBS subframe length.

As can be seen from the embodiment of FIG. 4, the sub-carrier spacing applied to the OFDM symbol for the MBS service is the half of the other sub-carrier spacing applied to a single OFDM symbol for the unicast service, and the CP length of the MBS OFDM symbol is double that of the unicast OFDM symbol. Therefore, the number of OFDM symbols contained in a single unicast subframe is double that of other OFDM symbols contained in a single MBS unicast subframe.

For example, provided that the CP ratio of the unicast OFDM symbol is set to "1/8", the sampling rate is set to 11.2 MHz, the FFT size is set to "1024", and six OFDM symbols are included in a single subframe, the CP length is 11.43 μs, and the sub-carrier spacing is 10.94 kHz. In the case of using the above-mentioned MBS service, provided that the CP length increases to 22.86 μs, the FFT size is set to 2048, and the sub-carrier spacing is reduced to 5.47 kHz, three MBS OFDM symbols are transmitted via a single MBS subframe. If there is no need to increase the CP length of the MBS OFDM symbol due to a short interval between cells, the MBS OFDM symbol may have the same structure as the unicast OFDM symbol.

According to the embodiment of FIG. 5, the Node-B transmits a variety of indication information indicating either the MBS subframe location, the sub-carrier spacing, or the IFFT size to the UE over a control channel, so that the UE receives MBS data and reconstructs the MBS data.

Figure 6A:
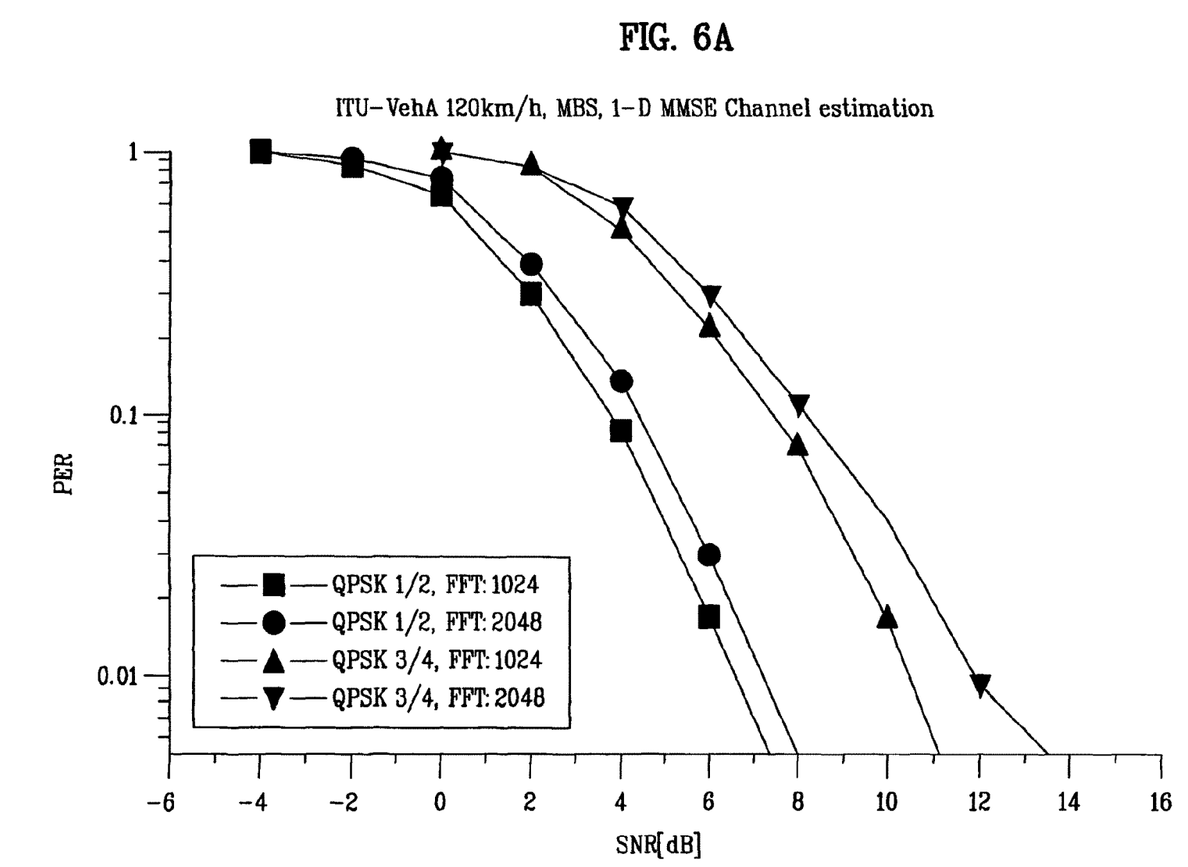
FIG. 6A shows a link performance acquired when a mobile terminal moves from a current location to another location at a speed of 120 km/h under an FFT size of 1024 according to an embodiment of the present invention.
Figure 6B:
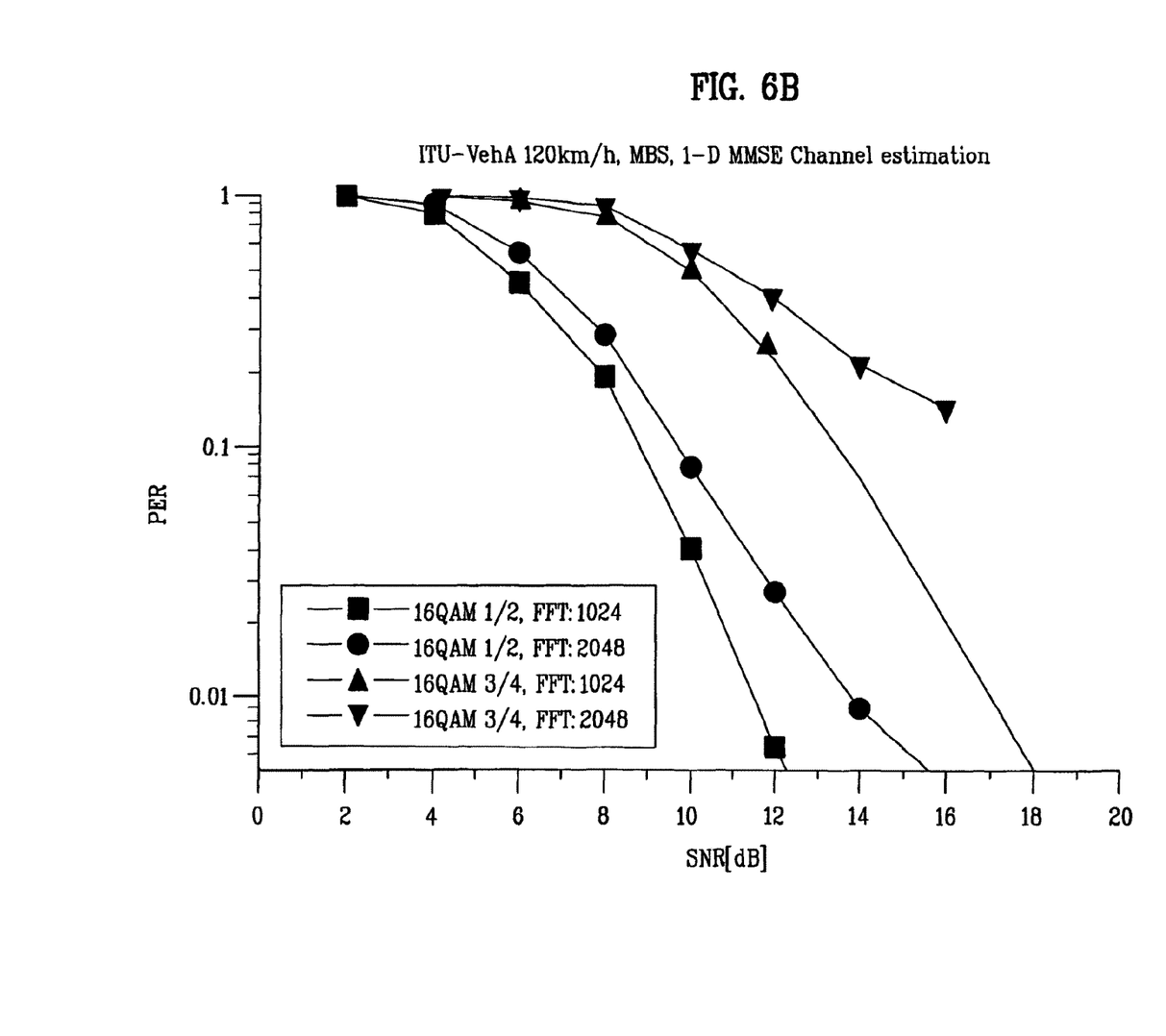
FIG. 6B shows a link performance acquired when a mobile terminal moves from a current location to another location at a speed of 120 km/h under an FFT size of 2048 according to an embodiment of the present invention.

FIG. 6A shows a link performance acquired when a mobile terminal moves from a current location to another location at a speed of 120 km/h under an FFT size of 1024 according to the present invention. FIG. 6B shows a link performance acquired when a mobile terminal moves from a current location to another location at a speed of 120 km/h under an FFT size of 2048 according to the present invention.

Referring to FIGS. 6A and 6B, if the IFFT size is 2048, a system performance is deteriorated due to the ICI caused by a short sub-carrier spacing. However, in the case of using a low Modulation and Coding Scheme (MCS), there is almost no difference in performance between FIG. 6A and FIG. 6B. Typically, a low MCS is used in a large-sized cell coverage, so that there is almost no problem caused by the shortened sub-carrier spacing.

Figure 7:
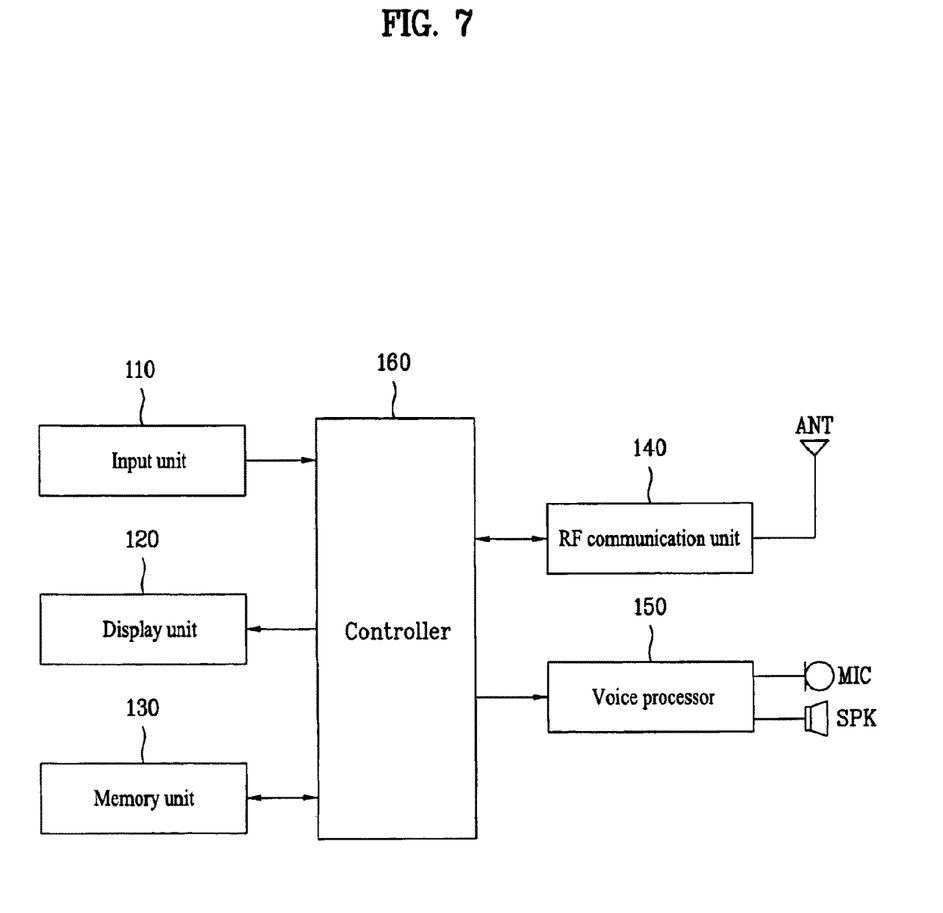
FIG. 7 is a block diagram illustrating a mobile terminal according to an embodiment of the present invention.

FIG. 7 is a block diagram illustrating a mobile terminal according to the present invention.

Referring to FIG. 7, the mobile terminal includes an input unit 110, a display unit 120, a memory unit 130, a RF communication unit 140, a voice processor 150, and a controller 160. The input unit 110 may allow a user to select his or her desired function, or may receive desired information from the user. The display unit 120 displays a variety of information for operating the mobile terminal. The memory unit 130 stores not only a variety of programs required for operating the mobile terminal but also Tx data to be transmitted to a receiving side. The RF communication unit 140 receives external signals, and transmits data to the reception end. The voice processor 150 converts a digital voice signal into an analog voice signal, amplifies the converted voice signal, or outputs the amplified voice signal to a speaker (SP). The voice processor 150 amplifies a voice signal received from a microphone (MIC), and converts the amplified voice signal into a digital signal. The controller 160 controls all operations of the mobile terminal.

The RF communication unit 140 is basically classified into a transmitter (not shown) and a receiver (not shown). Although operations of the receiver are opposite to those of the transmitter, the transmitter and the receiver have the same principles, so that only the transmitter will hereinafter be described in detail for the convenience of description.

Figure 8:
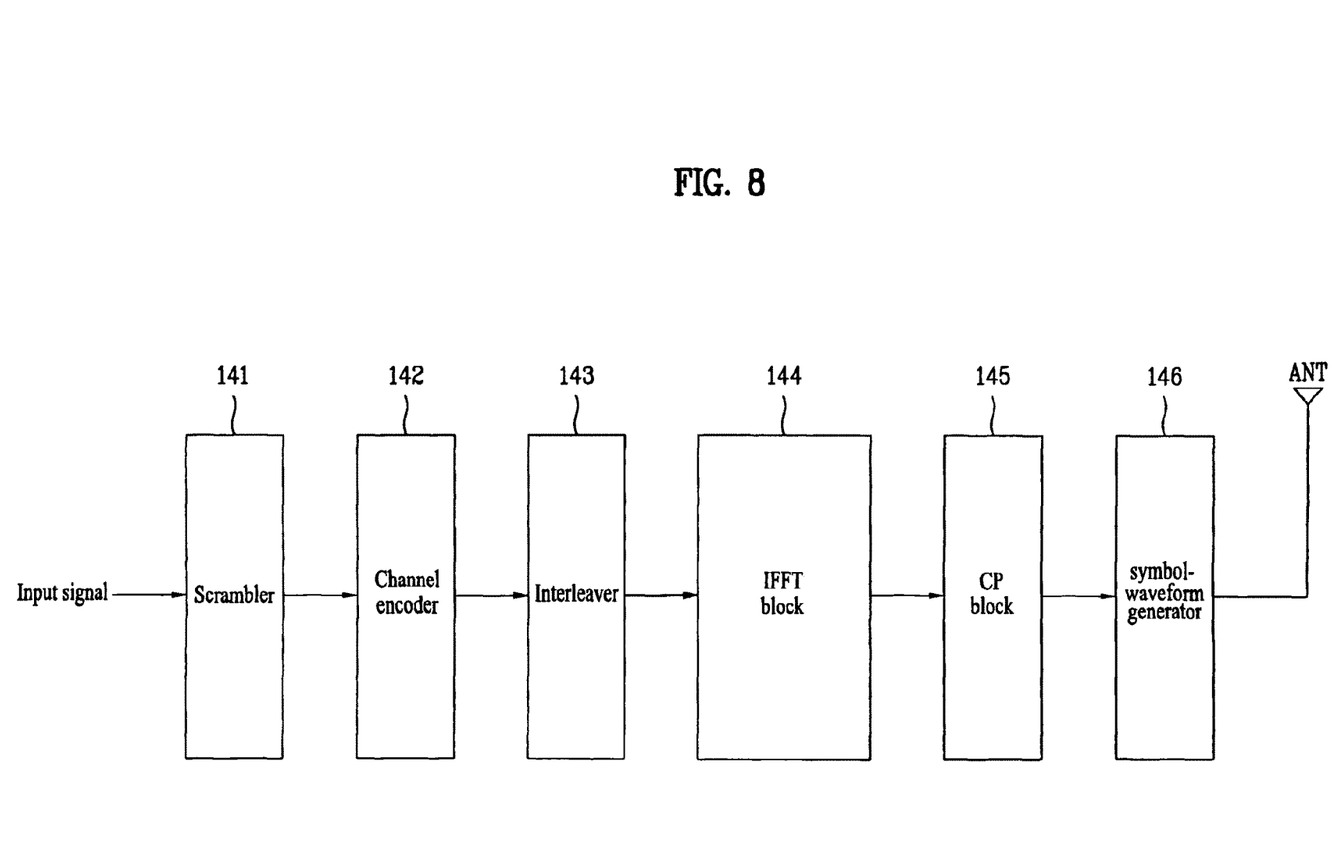
FIG. 8 is a block diagram illustrating a transmitter of a RF communication unit contained in the mobile terminal of FIG. 7 according to an embodiment of the present invention.

FIG. 8 is a block diagram illustrating a transmitter of a RF communication unit contained in the mobile terminal of FIG. 7 according to an embodiment of the present invention.

Particularly, in the transmitter of the mobile terminal based on the OFDMA communication scheme, input data is sequentially processed by a scrambler 141, a channel encoder 142, and an interleaver 143, and the processed input data is applied to the IFFT block 144. The WET block 144 modulates an input symbol sequence using sub-carriers. The transmitter can support a plurality of variable data rates, and may use different coding rates and different interleaving sizes according to the aforementioned data rates.

Generally, the channel encoder 142 uses a coding rate of 1/2 or 3/4. An interleaving size of the interleaver 143 may be determined according to the Number of Coded Bits per Symbol (NCBPS).

The IFFT block 144 performs the IFFT on the symbol sequence generated from the interleaver 143, and configures a single OFDM symbol. A CP block 145 inserts a guard interval (i.e., a cyclic prefix) for removing a multi-path interference into the OFDM symbol. A symbol-waveform generator 146 generates a symbol waveform to transmit a signal over a radio frequency (RF) channel. The symbol generated from the symbol-waveform generator 146 is modulated into a high-frequency signal by an RF processor (not shown), so that the high-frequency signal is transmitted over an antenna.

Referring to FIG. 7, the controller 160 receives indication information indicating the sub-carrier spacing from the Node-B via a receiver of the RF communication unit 140. A transmitter of the RF communication unit 140 recognizes the sub-carrier spacing on the basis of the indication information, and demodulates the signal received from the Node-B. Specific operations performed by the Node-B may also be executed by an upper node of the Node-B.

The above-mentioned embodiments have been proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention have been disclosed on the basis of a data communication relationship between the Node-B and the user equipment (UE). In this case, the Node-B is used as a terminal node of a network via which the Node-B can directly communicate with the user equipment (UE). Specific operations to be conducted by the Node-B in the present invention may also be conducted by an upper node of the Node-B as necessary. In other words, it will be obvious to those skilled in the art that various operations for enabling the Node-B to communicate with the user equipment (UE) in a network composed of several network nodes including the Node-B will be conducted by the Node-B or other network nodes other than the Node-B. The term "Node-B" may be replaced with a fixed station, eNode-B (eNB), or an access point as necessary. The user equipment (UE) may also be replaced with a mobile station (MS) or a mobile subscriber station (MSS) as necessary.

The above-mentioned embodiments of the present invention can be implemented by hardware, firmware, software, or a combination of them. In the case of implementing the present invention by hardware, a random access method for a wireless communication system according to the present invention can be implemented with ASICs (application specific integrated circuit), DSPs (digital signal processors), DSPDs (digital signal processing devices), PLDs (programmable logic devices), FPGAs (field programmable gate arrays), a processor, a controller, a microcontroller, and a microprocessor.

If operations or functions of the present invention are implemented by firmware or software, the present invention can be implemented in the form of a variety of formats, for example, modules, procedures, and functions. The software codes may be stored in a memory unit so that it can be driven by a processor. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can be applied to wireless communication systems, for example, a mobile communication system and a wireless Internet system.

The invention claimed is:

1. A method for transmitting data of a Node-B over a network of a wireless communication system employing multiple carriers, the method comprising:
   transmitting first indication information indicating first sub-carrier spacing of first cell through first control channel corresponding to first traffic channel;
   transmitting second indication information indicating second sub-carrier spacing of second cell through second control channel corresponding to second traffic channel;
   transmitting first data, which has been converted into a time-domain signal by sub-carriers having the first sub-carrier spacing therebetween, through the first traffic channel to first user equipment (UE) in the first cell; and
   transmitting second data, which has been converted into a time-domain signal by sub-carriers having the second sub-carrier spacing therebetween, through the second traffic channel to second user equipment (UE) in the second cell, the second sub-carrier spacing being different from the first sub-carrier spacing,
   wherein the first sub-carrier spacing is larger than the second sub-carrier spacing if a coverage of the first cell is larger than a coverage of the second cell,
   wherein a predetermined basic sub-carrier spacing of the wireless communication system is applied to the first control channel and the second control channel, and
   wherein each of the first indication information and the second indication information has been converted into a time-domain signal by sub-carriers having the predetermined basic sub-carrier spacing therebetween.

2. The method according to claim 1, wherein the first sub-carrier spacing is larger than the second sub-carrier spacing if the first data is for a unicast service and the second data is for a multicast or broadcast service.

3. The method according to claim 1, wherein the first data and the second data are transmitted according to a time division multiplexing (TDM) scheme.

4. The method according to claim 1, wherein a length of a first guard interval included in the first data and a length of a second guard interval included in the second data are variably configured by the first sub-carrier spacing and the second sub-carrier spacing.

* * * * *